(12) United States Patent
Enloe

(10) Patent No.: US 7,301,539 B2
(45) Date of Patent: Nov. 27, 2007

(54) METHOD AND APPARATUS FOR TRANSLATING AN ARC DEFINITION INTO A SERIES OF CONIC CURVE DEFINITIONS

(75) Inventor: Timothy M. Enloe, Pleasant Hill, CA (US)

(73) Assignee: Xerox Corporation, Stamford, CT (US)

( * ) Notice: Subject to any disclaimer, the term of this patent is extended or adjusted under 35 U.S.C. 154(b) by 511 days.

(21) Appl. No.: 10/813,278

(22) Filed: Mar. 31, 2004

(65) Prior Publication Data
US 2005/0219246 A1   Oct. 6, 2005

(51) Int. Cl.
  *G06T 11/00* (2006.01)
(52) U.S. Cl. .................................................. 345/427
(58) Field of Classification Search ................ 345/427
  See application file for complete search history.

(56) References Cited

OTHER PUBLICATIONS

Teller et al., "Constructing Easily Invertible Bezier Surfaces That Parametrize General Quadrics", 1991, ACM, pp. 303-315.*
Zirbel et al., "Using AutoCAD Release 13 for Windows", 1995, Que, pp. 443-447.*
Baudelaire et al., "Techniques for Interactive Raster Graphics", 1980, ACM, pp. 314-320.*

\* cited by examiner

*Primary Examiner*—Almis R. Jankus
(74) *Attorney, Agent, or Firm*—Oliff & Berridge, PLC

(57) ABSTRACT

A method for translating an arc definition into a series of conic curve definitions in a form usable by an imager includes first defining a given ellipse. Two intersecting vectors each intersect the ellipse to determine the exact beginning and ending points of the desired arc. The arc is then broken down into a series of sub-arcs no larger than 90 degrees each. The sub-arcs are then represented as conic curve definitions that are usable by an imager to accomplish imaging or clipping against a specified arc.

11 Claims, 4 Drawing Sheets

METHOD AND APPARATUS FOR TRANSLATING AN ARC DEFINITION INTO A SERIES OF CONIC CURVE DEFINITIONS

BACKGROUND OF THE INVENTION

1. Field of Invention

This invention is directed to a method and apparatus for translating an arc definition into a series of conic curve definitions.

2. Description of Related Art

Figures or drawings are often produced using well-known software applications, such as MICROSOFT PAINT® and POWERPOINT.® Such drawings or figures may be represented inside the computer as image elements such as curves or geometrical shapes. The description of the image may be emitted by a page description language (PDL) printer driver, which translates the computer specific image elements into their PDL equivalents, as defined by a page description language specification. The page description language print file that is produced specifies the arrangement of a page to be printed through commands that the printer carries out when the file is transmitted to it from the computer. Printer Control Language (PCL) and POSTSCRIPT are the two commonly used PDLs.

PDLs describe image elements as geometrical objects, such as lines, arcs, and the like. PDLs define image elements independently of the specifics of the printer hardware, so that the overall appearance of a page is consistent regardless of the specific printer used, though the quality of each graphic element may vary as each printer renders them to the best of its ability. For example, the printer is sent a command to draw a square or a character of a certain size in a specific location, rather than a computer transmitting to the printer the actual bits that make up the image of the square or the character.

The printer itself (rather than the user's computer) processes the page description language commands it finds in the print file through PDL decomposers. PDL decomposers are software modules responsible for interpreting the PDL specific commands into input usable by the imaging software module all the decomposers share, known as a common imager. Having all the decomposers use a common imaging package insures that the same page described in different PDLs will come out looking the same, regardless of the PDL used. It is very important that the user's choice of PDL does not result in different colors being used, or lines that are thicker or thinner than another PDL would produce.

A common image element occurring in figures or drawings are arcs. An arc can be defined by a bounding box encompassing an ellipse and two vectors that radiate outward from the center of the ellipse. The bounding box is the smallest rectangular box that fully encloses all of the points on the ellipse. An intersection of the first vector and the ellipse define a starting point of the arc, and an intersection of the second vector and the ellipse define an ending point of the arc. This arc can encompass anywhere from 0 to 360 degrees of the underlying ellipse. Using this format, an arc is fully defined by four pairs of coordinate values and a rotation indicator, making it the most concise format for the purpose of transmitting an arc definition from computer to the printer.

In order for an imager to render graphic elements onto paper, the imager must have the graphic elements defined in terms of mathematical formulas that can be used to determine whether each graphic element intersects, obscures, or otherwise effects other elements. An imager could internally represent a simple arc definition, such as described above, as a long series of line segment formulas when rendering it for printing by the hardware. However, to improve rendering speed, some imagers internally represent graphic elements in terms of not just cursor movements and line segments, but also more complex formulas such as Bezier curves and conic curves. A conic curve, for example, can be used by an imager to represent any arc having an arc length of less than 180 degrees. Thus, the use of a single conic curve formula can represent an arc that would require many line segment formulas, greatly reducing the number of calculations needed to determine whether another graphic element intersects or overlaps the arc in question. Arcs of 180 degrees or more require two or more conic curve formulas to represent them.

Accordingly, there is a need for a method and apparatus for translating an arc defined by four pair of spatial coordinates into a series of conic curve definitions, from which the imager derives conic curve formulas for its internal representation of the arc, and thereby significantly improving the efficiency of the rendering process beyond what more simplistic internal representations of the arc would allow.

SUMMARY OF THE INVENTION

In the present invention, a method to concisely represent an arc, initially defined in simplistic terms and having a span up to 360 degrees, as a series of conic cure definitions. The conic curve definitions will produce superior image quality with less processing time than previous methods might have produced, is described herein. Accordingly, the present invention provides a method and apparatus for defining an arc and then breaking the arc down into a series of sub-arcs no larger than 90 degrees each. The sub-arcs are then represented as conic curve definitions that are usable by an imager to accomplish imaging or clipping against a specified arc.

The arc is first defined as discussed above, using a bounding box which encompasses the ellipse and two vectors to define the arc. After defining the arc, a determination as to whether it is possible to translate the arc into conic curve definitions is made. If it is possible to translate the arc into conic curve definitions, the two vectors may then be used to divide the arc into sub-arcs, each with a starting point and an ending point.

After the starting and end points for all of the sub-arcs are determined, each sub-arc is represented as an individual conic curve definition. In addition to the starting and ending points of all of the sub-arcs, each conic curve definition includes the coordinates of a control point and a shape parameter.

The starting and end points, control point and shape parameter are passed to the imager in the proper order so that the imager can stroke or fill the arc as needed. This process allows for a concise arc definition with a quicker rendering time, than other internal representations would achieve.

DETAILED DESCRIPTION OF EXEMPLARY EMBODIMENTS

This invention provides a method and apparatus for translating an arc definition into a series of conic curve definitions for use by an imager. More specifically, to translate an arc definition into conic curve definitions, an arc is first defined, then divided into a series of sub-arcs, each no greater than 90 degrees. The sub-arcs are then represented as conic curve definitions. Each conic curve definition includes the starting and ending points for each of the sub-arcs and the coordinates of a control point and a shape parameter.

Figure 1:
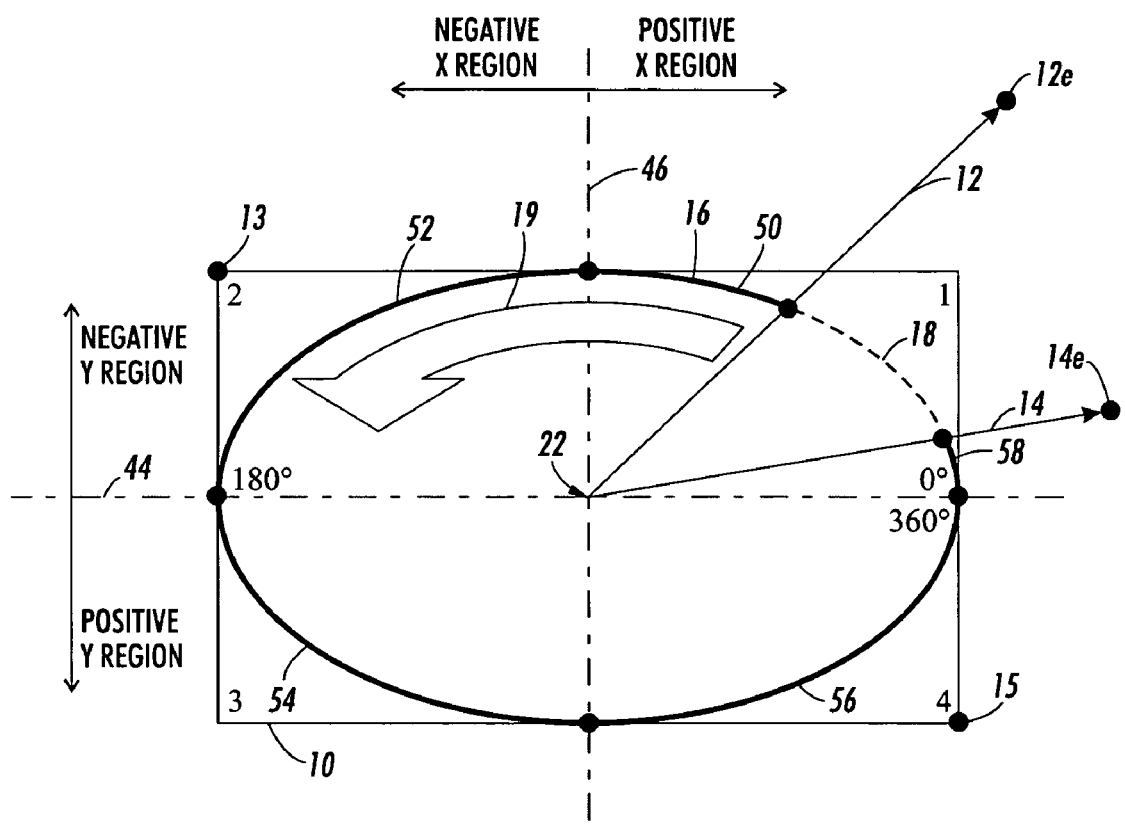
FIG. 1 is an illustration of an arc divided into five sub-arcs.

FIG. 1 shows an arc 16, defined by a bounding box 10 and two vectors 12 and 14. The bounding box 10 is defined by a pair of (x, y) coordinates that specify the opposite corners, 13 and 15, of a rectangle which precisely encompasses an ellipse 18, a portion of which is the desired arc 16. The portion of the ellipse 18 that makes up the arc 16 is defined by the angles of a beginning vector 12 and an ending vector 14 whose end points, 12e and 14e, are specified. This arc can encompass anywhere from 0 to 360 degrees of the underlying ellipse 18. An arrow 19 indicates whether the arc 16 extends in a clockwise or counter clockwise direction between the beginning vector 12 and the ending vector 14.

The starting point of both the beginning vector 12 and the ending vector 14 is a center point 22 of the ellipse 18, which is also a center point of the bounding box 10. The bounding box 10 may include quadrants 1, 2, 3 and 4, numbered in a counter clockwise fashion starting from 0 degrees, relative to the center point 22 of the ellipse 18, as shown in FIG. 1.

The rectangular coordinates 13 and 15, of the bounding box 10; the rectangular coordinates of the end points 12e and 14e of the beginning vector 12 and the ending vector 14, respectively; and a value that specifies whether the arc extends clockwise or counter clockwise between the beginning vector 12 and the ending vector 14, are all part of an input data set.

Figure 2:
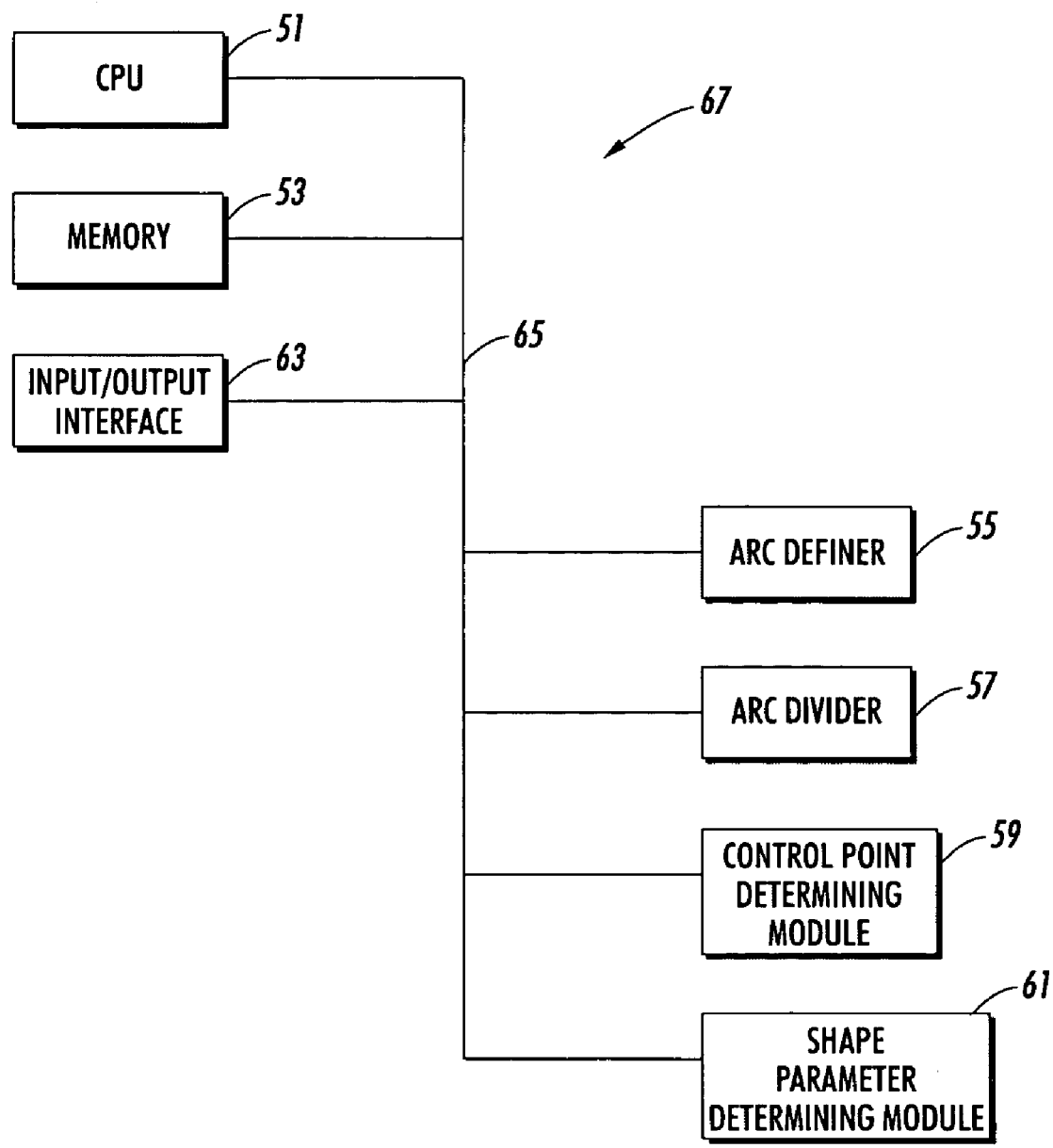
FIG. 2 is an illustration of an exemplary apparatus which can translate an arc into a series of conic curves, according to the present invention.

FIG. 2 illustrates an exemplary embodiment of an arc translating apparatus 67, which can translate an arc definition into a series of conic curve definitions, in accordance with this invention. The arc translating apparatus 67 includes a CPU 51, a memory 53, an input/output interface 63, an arc definer 55, an arc divider 57, a control point determining module 59 and a shape parameter determining module 61. The above components may be coupled together, for example, via a bus 65. While the apparatus 67 is illustrated using a bus architecture diagram, any other type of hardware and/or software configuration may be used.

The arc definer 55 receives an input data set via input/output interface 63, and may store the input data set in memory 53. Arc definer 55 may then determine whether the input data represents a viable arc, by performing tests on the input data set under the direction of the CPU 51.

For example, the arc definer 55 may determine that end point 12e of the beginning vector 12 or the end point 14e of the ending vector 14 is the same as the center point 22 of the ellipse, and therefore the relative angle of that vector cannot be determined. If the relative angle of the beginning vector 12 or ending vector 14 cannot be determined, the shape of the arc cannot be determined, and it will not be possible to create an image of the arc. In this case, the input data set is not usable.

Alternatively, the arc definer 55 may determine that the radius of the ellipse along the X-axis or along the Y-axis is zero. In this case, the arc includes all straight lines and will be represented as four line segments.

After determining that the input data set represents a viable arc, the arc definer 55 will determine the angles of the beginning vector 12 and the ending vector 14. Referring to FIG. 1, starting with the beginning vector 12, the arc is followed in a clockwise or counterclockwise direction. The angles of the beginning vector 12 and the ending vector 14 are determined from the arctangent (atan) based on the x coordinate and y coordinate values of the endpoints of the vectors. Since (atan) function has an output range from −90 to 90 degrees, it is necessary to adjust the angle depending on which quadrant 1, 2, 3 or 4, relative to the center point of the ellipse, into which the endpoint 12e of the beginning vector 12 and the end point 14e of the ending vector 14 fall. It is necessary to adjust the angle depending on which quadrant 1, 2, 3 or 4 the vectors fall, in order to get a value between 0 and 360 degrees as a final result.

For example, referring again to FIG. 1, if the x coordinate of the center point 22 is subtracted from the x coordinate of the end point 12e of the beginning vector 12 and the result is equal to zero, then the angle of the beginning vector 12 is equal to 90 degrees. If the subtraction of the x coordinate of center point 22 from the x coordinate of the end point 12e of beginning vector 12 is less than zero, then the beginning vector 12 is in quadrant 2 or 3, and 180 degrees is added to the angle of the beginning vector 12. If the subtraction of the y coordinate of the of the center point 22 from the y coordinate of the end point 12e of beginning vector 12 is greater than zero, then the beginning vector 12 is in quadrant 4, and 360 degrees is added to the angle of the beginning vector 12. (Note that according to FIG. 1, the downward direction away from the y-axis 44 is the increasingly positive direction.)

Further, if the subtraction of the x coordinate of the center point 22 from the x coordinate of the end point 14e of ending vector 14 is equal to zero, then the angle of the ending vector 14 is equal to 90 degrees. If the subtraction of the x coordinate of the center point 22 from the x coordinate of the end point 14e of ending vector 14 is less than zero, then the ending vector is in quadrant 2 or 3, and 180 degrees is added to the angle of the ending vector 14. If the subtraction of the y coordinate of the center point 22 from the y coordinate of the end point 14e of the ending vector 14 is greater than zero, the ending vector 14 is in quadrant 4, and 360 degrees is added to the angle of the ending vector.

After the angles of the beginning vector 12 and the ending vector 14 have been determined, (including the value added to each of the vector angles based on which quadrant the vectors respectively fall into), the arc definer 55 will pass the data including the bounding box, starting vector 12 angle and ending vector 14 angle to the arc divider 57. The arc divider 57 will use the values of the angle of each of the two vectors to break up the arc into as many as five sub-arcs.

The arc divider 57 divides the arc into sub-arcs, each of which may overlay no more than 90 degrees of the underlying arc. Every time an X-axis or a Y-axis is crossed, one sub-arc will end and another will begin. For example, an arc of less than 90 degrees may be defined by only one sub-arc, or may be defined by two sub-arcs if it crosses the X-axis 44 or the Y-axis 46. An arc of, for example, 100 degrees, may be defined by two sub-arcs, the first sub-arc ending and the second sub-arc beginning at the point where an axis is crossed. An arc of, for example, greater than 270 degrees, may be defined by a total of five sub-arcs; three intermediate sub-arcs of 90 degrees and the first and last sub-arc being equal to or less than 90 degrees. The first sub-arc may extend from a first vector to a first axis to be crossed. The next three 90 degree sub-arcs may extend from one axis to the next axis in turn, and the last sub-arc may extend from the final axis crossed to the second vector. Any time either an X-axis 44 or a Y-axis 46 is crossed by the arc, one sub-arc will end and another sub-arc will begin. Thus, each sub-arc overlays no more than 90 degrees of the underlying arc.

For example, in an embodiment of the present invention, as shown in FIG. 1, an arc greater than 270 degrees, that has both the beginning vector 12 and the ending vector 14 extending into the same quadrant, will be divided by the arc divider 57 into five sub-arcs. A first sub-arc 50 may extend from the beginning vector 12 to and/or across a first axis, for example, the Y-axis 46. The next three 90 degree sub-arcs 52, 54 and 56 may extend from the first axis, for example the Y-axis 46, to the next axis in turn, for example the X-axis 44 to the next axis, for example the Y-axis 46, to the final axis, for example, the X-axis 44, and the last sub-arc 58 may extend from the final axis to the ending vector 14.

The arc, according to the present method may be defined in either a clockwise or counter-clockwise direction. Thus, the sub-arcs will be ordered by increasing starting vector angles for the arcs in the counter-clockwise direction, or by decreasing starting vector angles for the arcs in the clockwise direction. For this ordering to remain meaningful, any sub-arc 50, 52, 54, 56 or 58 or arc 16 that crosses an angle discontinuity at 0/360 degrees is treated like two separate (but connected) arcs. As shown in the embodiment illustrated in FIG. 1, for example, the sub-arc 56 may end at 360 degrees and the final sub-arc 58 may then start at 0 degrees for the arc in the counter-clockwise direction. In the case of the arc in the clockwise direction, the final sub-arc 58 ends at 0 degrees, and the sub-arc 56 starts at 360 degrees.

Thus, an arc having an angle greater than 270 degrees would require five sub-arcs. The starting point for the first sub-arc 50 is defined by an intersection of the beginning vector 12 and the ellipse 18 enclosed by the bounding box 10. The ending point for the final sub-arc 58 is defined by an intersection of the ending vector 14 and the ellipse 18 enclosed by the bounding box 10. Because the starting and ending points of the other sub-arcs 52, 54 and 56 are all on either the X-axis 44 or the Y-axis 46, these other sub-arcs 52, 54 and 56 may be derived from the definition of the bounding box 10 that contains the ellipse 18 and/or the center point 22 of the ellipse that was previously calculated.

After determining the starting point and ending points of each of the sub-arcs, the arc divider transmits the information to the control point determining module 59. The functioning of the control point determining module 59 will be explained with reference to FIG. 3.

Figure 3:
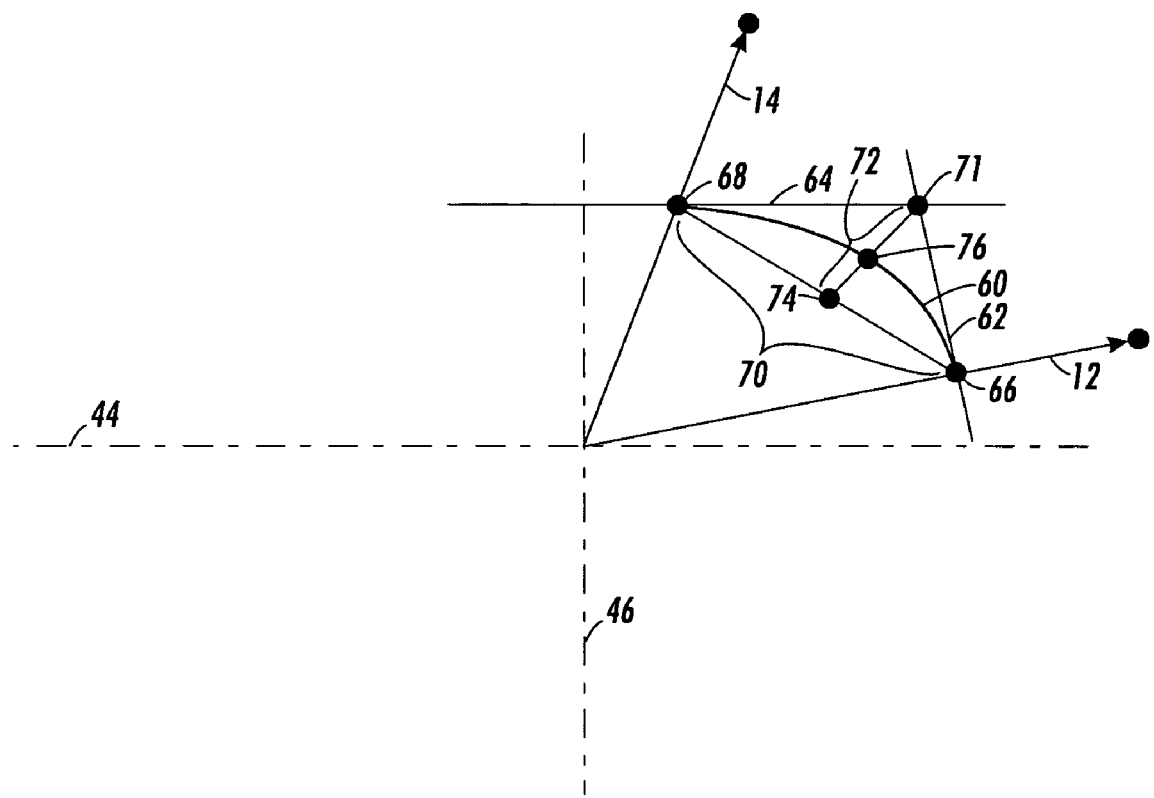
FIG. 3 is an illustration of a sub-arc with tangent lines through the starting and ending points of the sub-arc.

Referring to FIG. 3, a simple sub-arc 60, with tangent lines 62 and 64 through the starting point 66 and the ending point 68 of the sub-arc 60 is illustrated. The tangent lines 62 and 64 extend so that they intersect at a conic curve control point 71. The tangent line 62 is tangent to the sub-arc 60 at the starting point 66 where the beginning vector 12 intersects the sub-arc 60. The tangent line 64 is tangent to the sub-arc 60 at the ending point 68 where the ending vector 14 intersects the sub-arc 60. The conic curve control point 71 of the sub-arc 60 is the point where the tangent lines 62 and 64, drawn through the starting point 66 and the ending point 68 of the sub-arc 60, respectively, intersect. A chord segment 70 of the sub-arc 60 is a line segment that connects the starting point 66 of the sub-arc 60 to the ending point 68 of the sub-arc 60. The control point segment 72 of the sub-arc 60 is the line segment that connects the conic curve control point 71 to a mid-point 74 of the chord segment 70 of the sub-arc 60. A point 76 is defined as the intersection of the control point segment 72 with the sub-arc 60.

After transmitting the information to the control point determining module 59, the shape parameter module 61 then determines the shape parameter based on the control point calculation performed by the control point determining module 59. A conic curve shape parameter of the sub-arc 60 is the ratio of the distance between the mid-point 74 of the chord segment 70 of the sub-arc 60, and the point 76 where the control point segment 72 intersects with the sub-arc 60 over the overall length of the control point segment 72 of the sub-arc 60. This ratio determines the amount of curvature the conic curve will have. The equation for the ellipse being a known factor allows for the determination of the shape parameter that will result in the proper curvature to be determined using the process described above.

After the shape parameter module 61 completes the calculation of the shape parameter, the data, including the starting point, ending point, control point, and shape parameter for each sub-arc can be transmitted to the imager for rendering as the arc. The data may be output by the input/output interface 63, to the imager (not shown).

It should be appreciated that the arc translating apparatus 67 can be implemented on a programmed microprocessor or microcontroller and peripheral integrated circuit elements, an ASIC or other integrated circuit, a digital signal processor (DSP), a hardwired electronic or logic circuit, such as a discrete element circuit, a programmable logic device, such as a PLD, PLA, FPGA or PAL, or the like. In general, any device that is capable of implementing the functionality disclosed herein can be used to implement the arc translating apparatus 67. Each of the various signal lines outlined above in FIG. 2, connecting the various modules and the like, can be direct signal line connections or can be software connections implemented using an implication programming interface or the like. It should be appreciated that any appropriate hardware, firmware or software elements or data structures can be used to implement one or more of the various modules and/or signal lines outlined above with respect to FIG. 2.

It should be understood that each of the elements described above with respect to FIG. 2 may comprise circuits, routines, applications, modules or the like, and may be implemented as software that is stored on a computer-readable medium, such as hard disks, DVD-ROM disks, DVD-RAM disks, compact disks, magneto-optical disks, floppy disks, tape, PROMS, Flash, DRAM, etc., and that is executable on a programmed general purpose computer, a programmed special purpose computer, a programmed microprocessor, a programmed digital signal processor or the like. Such a computer-readable medium includes using a carrier wave or the like to provide the software instructions to a processing device. It should also be understood that each of the circuits, routines, applications, modules or the like may be implemented as portions of a suitably programmed general purpose computer. Alternatively, each of the circuits, routines, applications, modules or the like may be implemented as physically distinct hardware circuits within an ASIC, using an FPGA, a PLD, a PLA and/or a PAL, or using discrete logic elements or discrete circuit elements. The particular form of the circuits, routines, applications, modules or the like is a design choice. It should be appreciated that the circuits, routines, applications, modules or the like do not need to be of the same design.

Accordingly, although the invention has been described relative to a hardware embodiment, the invention may also be practiced using a software implementation. In this case, software such as, for example, a computer program, may execute the steps of the method. In this situation, the overall process exemplified by FIG. 2 can be performed by, for example, a microprocessor executing the steps shown in FIG. 4.

Figure 4:
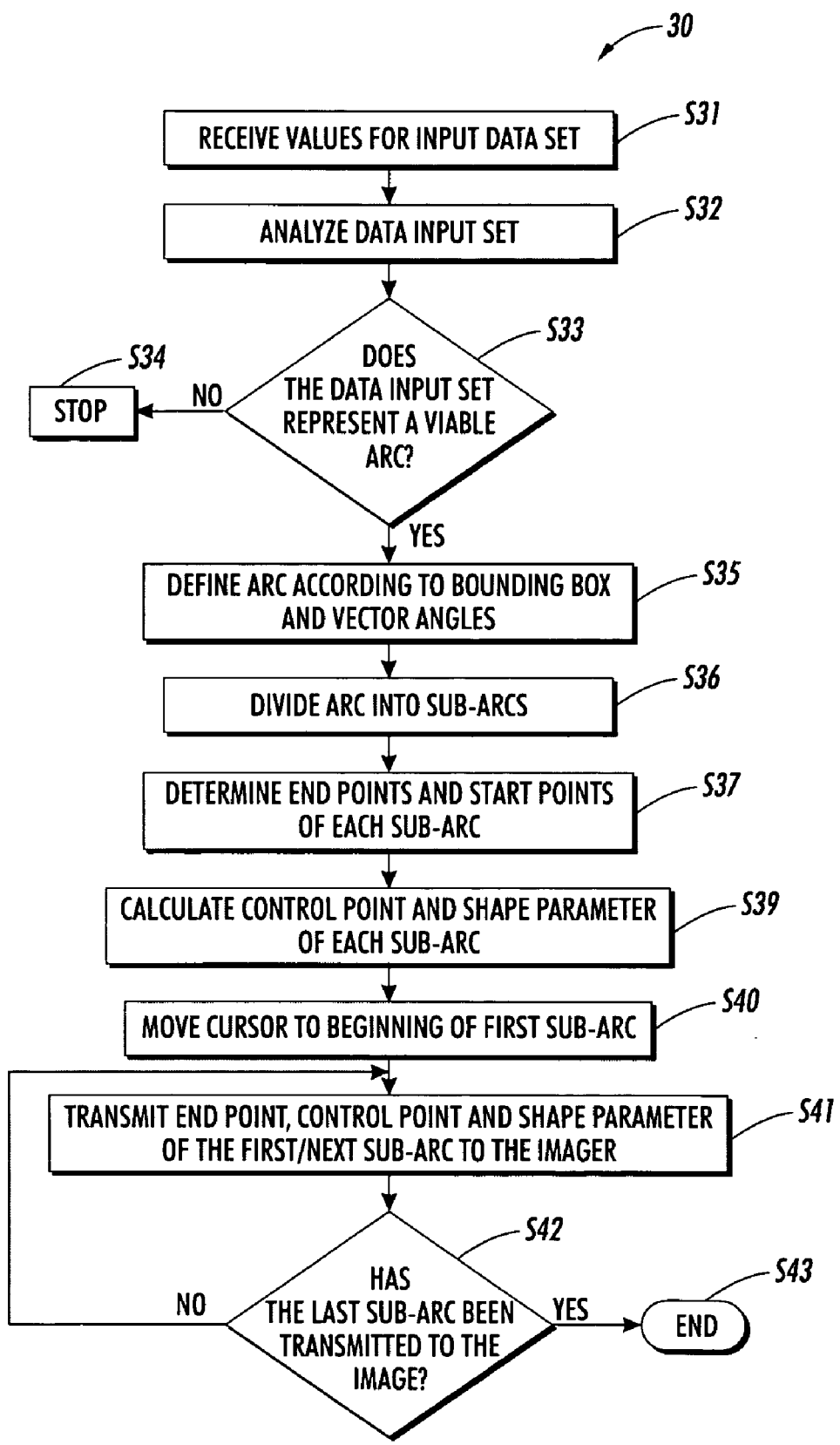
FIG. 4 is a flow chart diagramming the process of translating an arc to a series of conic curves.

Referring now to FIG. 4, a flowchart 30 illustrates an exemplary method of translating an arc, such as that shown in FIG. 1, to a series of conic curves. The first step in this method is to receive values for the input data set, as shown at step S3 1. Next, the input data set is analyzed at step S32. At step S33, a determination is made as to whether the data represents a viable arc. To be a viable arc, the beginning vector 12 and the ending vector 14 must have a finite extent from the center of the ellipse, and the ellipse must have finite (i.e., non-zero) major and minor axes. If the input data set is determined to not correspond to a viable arc, the process of translating the arc into the conic curve definition will be stopped, as shown at step S34.

If it has been determined that the input data set represents a viable arc, the angles at which the beginning vector 12 and the ending vector 14 extend from the center of the ellipse are determined and an arc is defined according to a bounding box and the vector angles, as shown at step S35.

Then, at step S36, the arc is broken down into component sub-arcs. At step S37, the beginning point and ending point for each sub-arc is determined.

After determining the end points and start points of each of the sub-arcs at step S37, the coordinates of the control point and shape parameter are calculated, as shown at step S39.

After the control point and shape parameter have been calculated, the direction to move a cursor to the beginning of a first sub-arc may be transmitted to the imager, as shown at step S40. The endpoint, control point and shape parameter of the first/next sub-arc is then transmitted to the imager at step S41, which moves the cursor to the endpoint of the first/next sub-arc, along a trajectory defined by the control point and shape parameter. A determination is then made, whether the last sub-arc has been transmitted to the imager, as shown at step S42. If not, the process returns to step S41, wherein the endpoint, control point and shape parameter of the next sub-arc is transmitted to the imager. If the last sub-arc has been reached, the process ends, as shown at step S43. The imager may then stroke or fill the originally specified arc as needed.

Those skilled in the art will recognize that certain variations and/or additions can be made in the foregoing illustrative embodiments. It is apparent that various alternatives and modifications to the embodiments can be made thereto. In other embodiments, for example, the conic curve representation of the sub-arc can also be used as a clipping boundary and in graphic applications like a typical paint program. It is, therefore, the intention in the appended claims to cover all such modifications and alternatives as may fall within the true scope of the invention.

What is claimed is:

1. A method of representing an arc as a series of conic curves, the method comprising:
   defining an arc;
   determining a bounding box;
   calculating vector angles for a starting vector and ending vector;
   dividing the arc into a plurality of sub-arcs, each sub-arc being defined by a conic curve definition;
   calculating a shape parameter for the conic curve definition;
   determining coordinates of a control point and a mid point of an arc chord; and
   defining a control point segment between the mid point of the arc chord and the control point.

2. The method of claim 1, wherein each of the sub-arcs is 90 degrees or less.

3. The method of claim 1, further comprising:
   determining a starting point and ending point of each of the plurality of sub-arcs, wherein the plurality of sub-arcs includes at least a first sub-arc and a second sub-arc and further wherein the ending point of the first sub-arc is the starting point of the second sub-arc.

4. The method of claim 1, further comprising:
   calculating the shape parameter based on a ratio of a distance between the mid point of the arc chord and an intersection of the control point segment and the sub-arc, and a length of the control point segment.

5. The method of claim 1, wherein a direction of the arc is clockwise.

6. The method of claim 1, wherein a direction of the arc is counter clockwise.

7. The method of claim 1, further comprising:
   transmitting the conic curve definitions to an imager.

8. A computer-readable medium having computer-readable program code embodied therein, the computer-readable program code when executed causing a computer to perform the method of claim 1.

9. An apparatus for translating an arc definition into a series of conic curve definitions, comprising:
   an arc definer, which defines the arc using a bounding box, starting vector and ending vector;
   an arc divider, which divides the arc into a plurality of sub-arcs, each sub-arc being defined by a conic curve definition;
   a control point determining module, which determines the control point for each sub-arc, based on the intersection point of the two lines which are tangent to the endpoints of the sub-arcs; and
   a shape parameter module which calculates a shape parameter, based on the ratio of a distance between the mid point of the arc chord and an intersection of a control point segment and the sub-arc, and a length of the control point segment.

10. The apparatus of claim 9, wherein the arc divider further determines a starting point and ending point for each sub-arc.

11. The apparatus of claim 9, further comprising:
    an input/output interface which outputs the ending point, control point and shape parameter for each sub-arc to an imager.

* * * * *